(12) United States Patent  
Shino et al.

(10) Patent No.: US 12,153,467 B2  
(45) Date of Patent: Nov. 26, 2024

(54) PORT REPLICATOR

(71) Applicant: Panasonic Intellectual Property Management Co., Ltd., Osaka (JP)

(72) Inventors: Keisuke Shino, Osaka (JP); Akira Iwamoto, Osaka (JP); Shinji Fujita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 154 days.

(21) Appl. No.: 17/860,638

(22) Filed: Jul. 8, 2022

(65) Prior Publication Data

US 2022/0342445 A1 Oct. 27, 2022

Related U.S. Application Data

(63) Continuation of application No. PCT/JP2020/047808, filed on Dec. 22, 2020.

(30) Foreign Application Priority Data

Jan. 17, 2020 (JP) .................................. 2020-006159

(51) Int. Cl.  
*G06F 1/16* (2006.01)  
*H01R 13/629* (2006.01)

(52) U.S. Cl.  
CPC ......... *G06F 1/1632* (2013.01); *H01R 13/629* (2013.01)

(58) Field of Classification Search  
CPC .................................................... G06F 1/1632  
See application file for complete search history.

(56) References Cited

U.S. PATENT DOCUMENTS

| | | | | |
|---|---|---|---|---|
| 5,144,290 A | * | 9/1992 | Honda | G06F 1/1681 345/905 |
| 5,619,397 A | * | 4/1997 | Honda | G06F 1/1632 439/157 |
| 6,135,801 A | * | 10/2000 | Helot | G06F 1/1632 439/376 |
| 8,644,018 B2 | * | 2/2014 | Hung | G06F 1/1632 16/302 |
| 9,454,184 B2 | * | 9/2016 | Lee | G06F 1/1632 |
| 9,632,536 B1 | * | 4/2017 | Kuo | G06F 1/1632 |
| 10,095,274 B2 | * | 10/2018 | Nakatani | G06F 1/1654 |
| 10,248,162 B1 | * | 4/2019 | Cheng | F16M 11/041 |

(Continued)

FOREIGN PATENT DOCUMENTS

| | | | |
|---|---|---|---|
| JP | H07072961 A | * | 3/1995 |
| JP | H11053079 A | * | 2/1999 |

(Continued)

OTHER PUBLICATIONS

International Search Report for corresponding Application No. PCT/JP2020/047808, mailed Mar. 23, 2021.

*Primary Examiner* — Nidhi Thaker  
(74) *Attorney, Agent, or Firm* — Renner, Otto, Boisselle & Sklar, LLP

(57) ABSTRACT

Provided is a port replicator including: a body having an opening; a terminal accommodated in the body and exposed from the opening; a shaft provided in the body; a retainer that rotatably holds the body about a rotation axis of the shaft; and one or more elastic bodies attached to the body and pressing the body in a predetermined rotation direction.

11 Claims, 19 Drawing Sheets

(56) References Cited

U.S. PATENT DOCUMENTS

| | | | |
|---|---|---|---|
| 10,348,026 B1* | 7/2019 | Cheng | H01R 13/447 |
| 2005/0248917 A1* | 11/2005 | Hiroyoshi | G06F 1/1632 |
| | | | 361/679.41 |
| 2007/0288678 A1* | 12/2007 | Langberg | G11B 33/124 |
| | | | 710/303 |
| 2008/0239658 A1* | 10/2008 | Chou | G06F 1/1632 |
| | | | 361/679.42 |
| 2010/0265652 A1* | 10/2010 | Agata | G06F 1/1632 |
| | | | 361/679.41 |
| 2014/0268542 A1 | 9/2014 | Moon | |

FOREIGN PATENT DOCUMENTS

| | | |
|---|---|---|
| JP | 2000-089851 A | 3/2000 |
| JP | 2004-318648 A | 11/2004 |
| JP | 2019-160324 A | 9/2019 |

* cited by examiner

PORT REPLICATOR

TECHNICAL FIELD

The present disclosure relates to a port replicator.

BACKGROUND ART

An electronic device such as a laptop PC or a tablet PC may be connected to an extension unit called a port replicator to charge a battery built in the electronic device or extend functions.

For example, PTL 1 discloses an extension unit that is provided with a connector for connecting an electronic device to a housing.

CITATION LIST

Patent Literature

PTL 1: Unexamined Japanese Patent Publication No. 2000-89851

SUMMARY OF THE INVENTION

The extension unit disclosed in PTL 1 has a problem that multiple electronic devices different in type cannot be connected.

Thus, an object of the present disclosure is to provide a port replicator that can connect multiple electronic devices different in type.

The port replicator according to the present disclosure includes the following: a body having an opening; a terminal accommodated in the body and exposed from the opening; a shaft provided in the body; a retainer that rotatably holds the body about a rotation axis of the shaft; and one or more elastic bodies attached to the body and pressing the body in a predetermined rotation direction.

The present disclosure enables providing a port replicator that can connect multiple electronic devices different in type.

DESCRIPTION OF EMBODIMENT

Background to Present Disclosure

Figure 1:
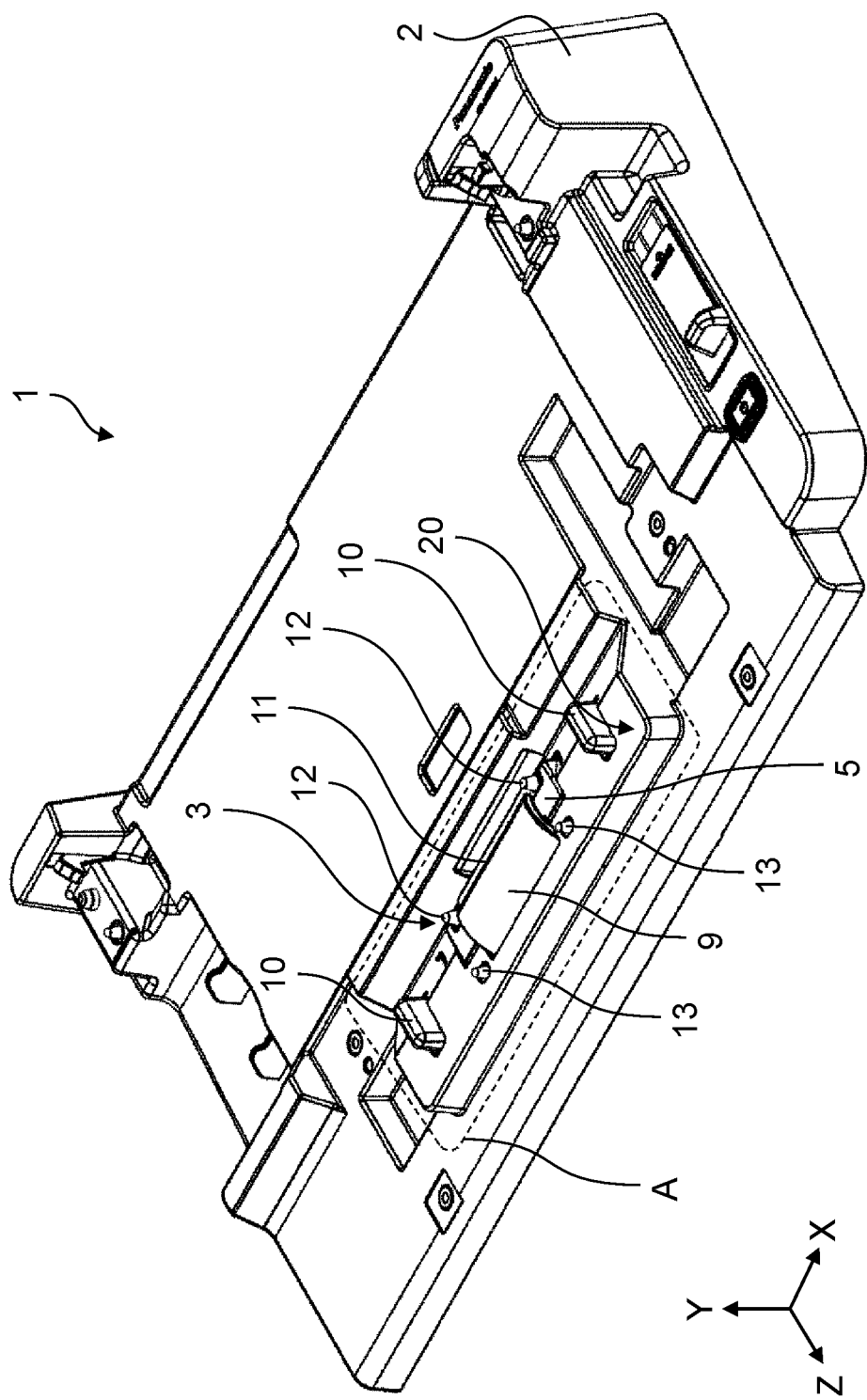
FIG. 1 is a perspective view of a port replicator according to a first exemplary embodiment of the present disclosure.

There is known an extension unit called a port replicator that can be connected to an electronic device such as a laptop PC or a tablet PC to reinforce an input-output terminal, and the like. For example, PTL 1 discloses an extension unit that includes an extension-unit connector connected to a body connector provided on a bottom surface of a laptop computer. When a personal computer is placed on a housing of the extension unit, the body connector is connected to the extension-unit connector. As a result, an input-output terminal and the like provided in the extension unit are electrically connected to the personal computer.

In recent years, a tablet PC has become widespread in addition to a laptop PC. The tablet PC is more convenient to be connected to the port replicator with a display of the tablet PC inclined to allow the display to be easily viewed when the tablet PC is connected to the port replicator. Although the laptop PC is often provided on its bottom surface with a terminal for connection to a port replicator, the tablet PC is often provided on its side surface with a terminal for connection thereto.

As described above, the electronic device varies in shape, position of the terminal, or the like depending on a type of the electronic device. This requires a port-replicator terminal to be changed in angle and the like depending on the type of the electronic device. Thus, even when the laptop PC and the tablet PC have terminals identical in shape, a port replicator dedicated to each electronic device needs to be prepared.

The port replicator includes components in which a terminal is particularly expensive, so that there is a demand for connecting multiple electronic devices with one port replicator.

Thus, the present inventors have studied a port replicator capable of connecting multiple electronic devices different in type, and have reached the following disclosure.

The port replicator according to an aspect of the present disclosure includes the following:
- a terminal;
- a body that accommodates the terminal and has an opening for exposing the terminal;
- a shaft provided in the body;
- a retainer that rotatably holds the body about a rotation axis of the shaft; and
- one or more elastic bodies attached to the body and pressing the body in a predetermined rotation direction.

This configuration enables providing a port replicator that can connect multiple electronic devices different in type.

The port replicator may be configured to further include a protruding member disposed on the body and protruding outward in the predetermined rotation direction from the body,
wherein when the protruding member receives a force, the body is rotated in a direction opposite to the predetermined rotation direction.

This configuration enables a connection part of the terminal to be directed in an appropriate direction by rotating the body.

The port replicator may be configured to further include a stopper that comes into contact with the protruding member when the protruding member rotates in a direction opposite to the predetermined rotation direction, and
the protruding member comes into contact with the stopper to restrict rotation of the body in the direction opposite to the predetermined rotation direction.

This configuration enables improvement in stability of connection by restricting the rotation of the body.

The protruding member may include multiple positioning pins extending in an exposure direction of the terminal from the opening of the body.

This configuration facilitates attachment of the electronic device using the positioning pin to enable improvement in connection stability after the attachment.

The multiple positioning pins may be made of metal.

This configuration enables improvement in strength of the positioning pins to which a load is likely to be applied.

The port replicator may be configured such that the body includes multiple attachment parts located on the rotation axis,
the terminal is disposed between the multiple attachment parts, and
the elastic bodies are attached to the respective multiple attachment parts.

This configuration causes the elastic bodies to be disposed at respective opposite ends of the terminal, and thus enabling the body to be stably rotated.

The port replicator may be configured to further include the following:
a cover configured to cover the terminal; and
a pusher configured to rotatably support the cover,
wherein the pusher is attached to the body, and
the cover is configured to cover the terminal when the pusher is not pressed, and is configured to be rotated to expose the terminal when the pusher is pressed.

This configuration enables the terminal to be covered and protected with the cover when the terminal is not in use.

When the body and the pusher rotate in a direction opposite to the predetermined rotation direction, a gap may be formed between the cover and the body.

This configuration enables shortening a stroke of the pusher when the pusher is pressed to open the cover, and thus contributing to decrease in thickness of the port replicator.

The port replicator may be configured to further include a housing that accommodates the terminal, the body, the shaft, the retainer, and the one or more elastic bodies,
wherein the one or more elastic bodies are pressed against the housing to press the body in the predetermined rotation direction.

This configuration enables the electronic device to be mounted on the housing.

The port replicator may be configured to further include an attachment that is detachably attached to the housing.

This configuration enables an electronic device different in shape to be connected to the port replicator by adding the attachment to the housing or changing the attachment.

The attachment may include a pressing part that rotates the body in a direction opposite to the predetermined rotation direction.

This configuration enables changing an angle of the body by attaching the attachment.

Hereinafter, exemplary embodiments will be described with reference to the drawings.

First Exemplary Embodiment

[General Configuration]

Figure 2:
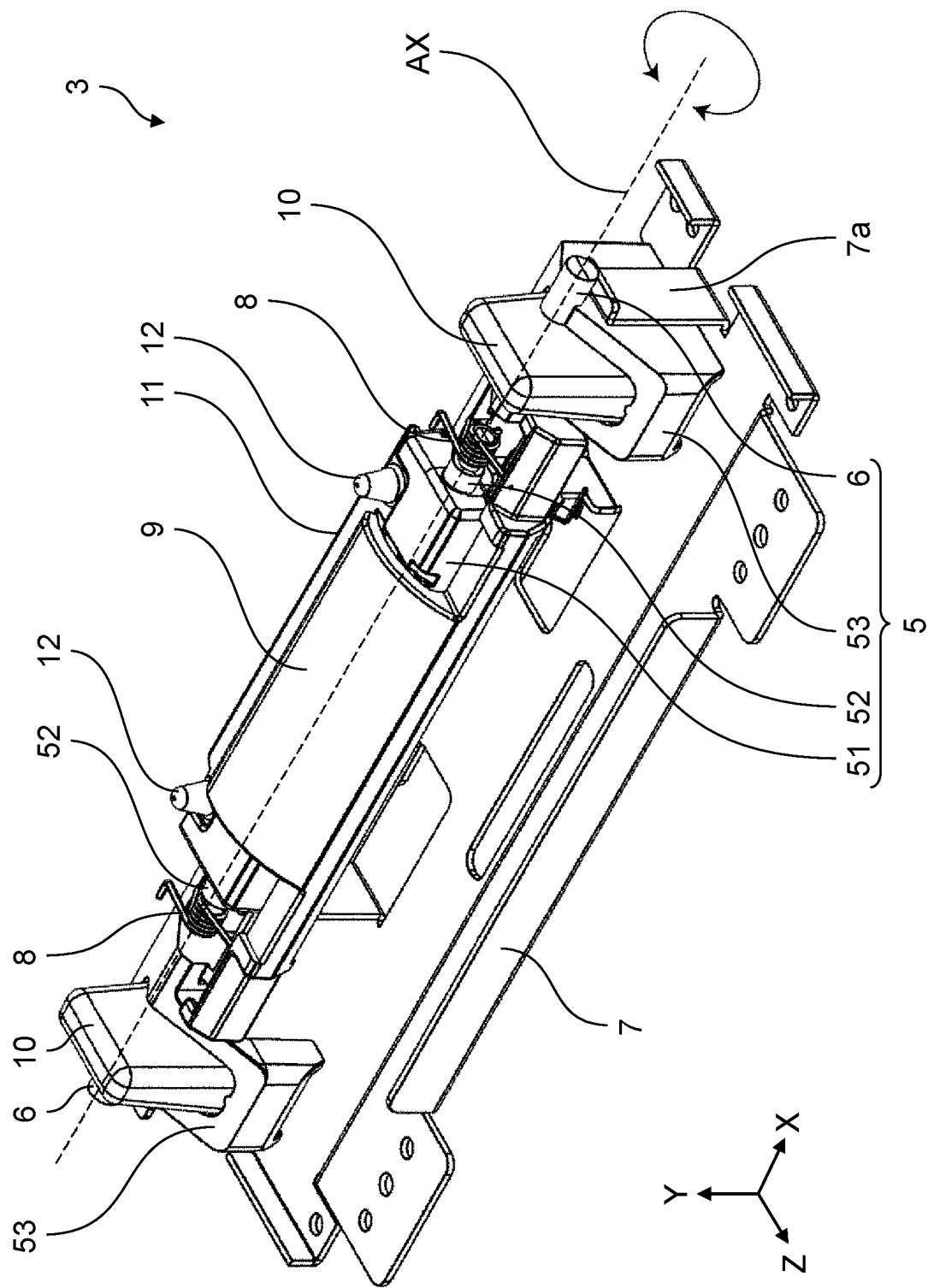
FIG. 2 is an enlarged view of a connector extracted from the port replicator of FIG. 1.
Figure 3:
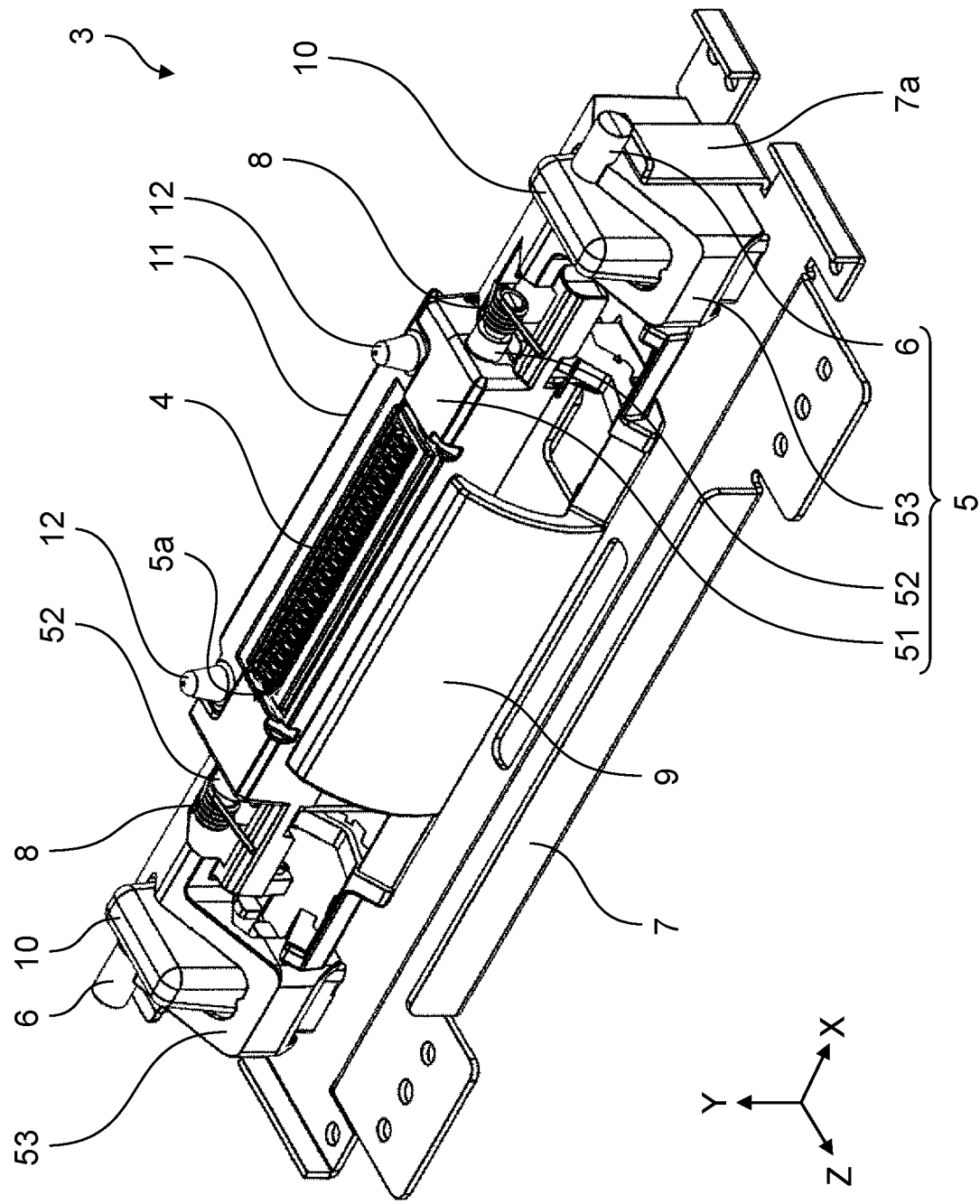
FIG. 3 is a diagram illustrating the connector of FIG. 2 with a cover opened.
Figure 4:
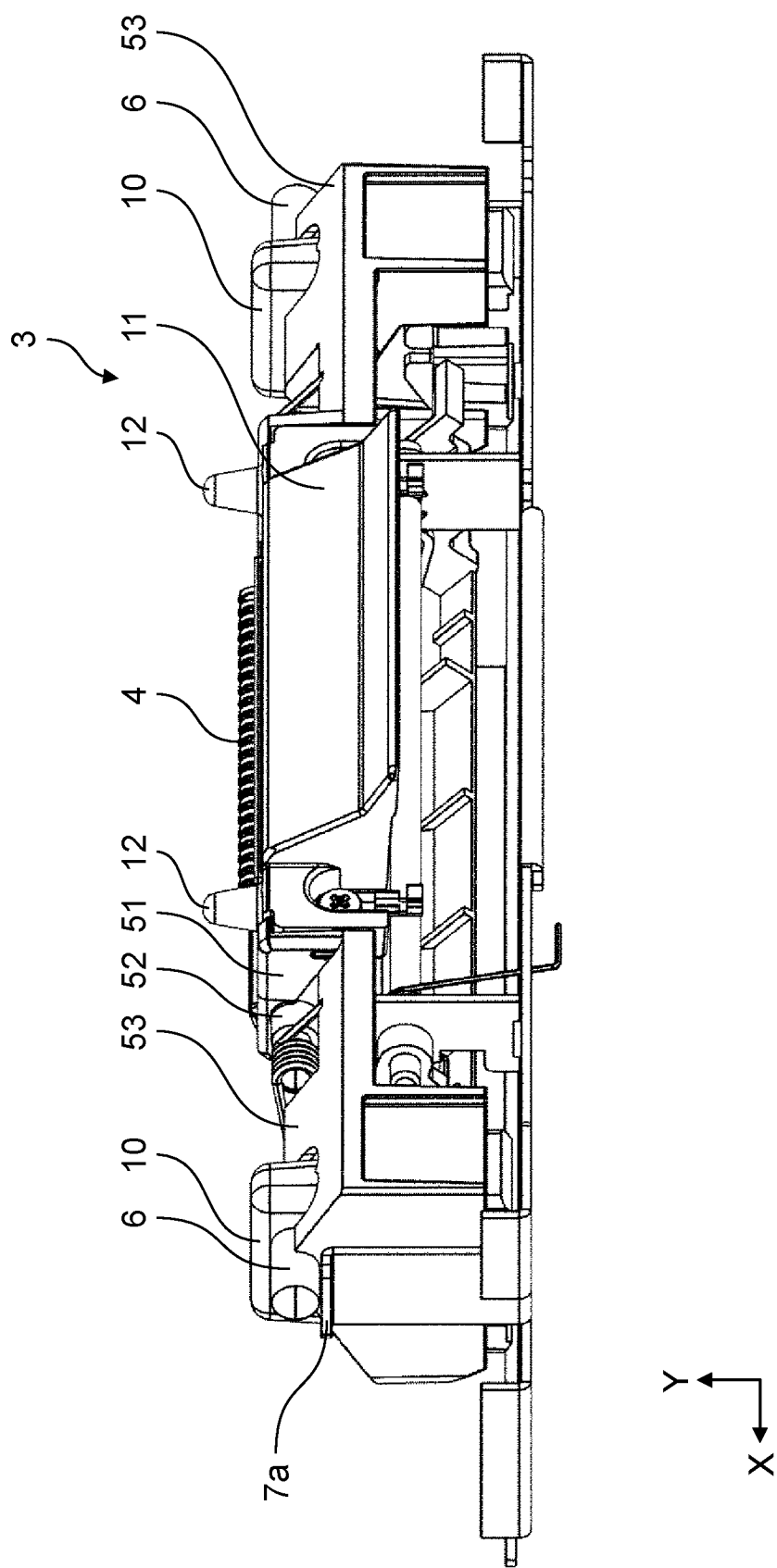
FIG. 4 is a diagram of the connector of FIG. 3 as viewed from another direction.
Figure 5:
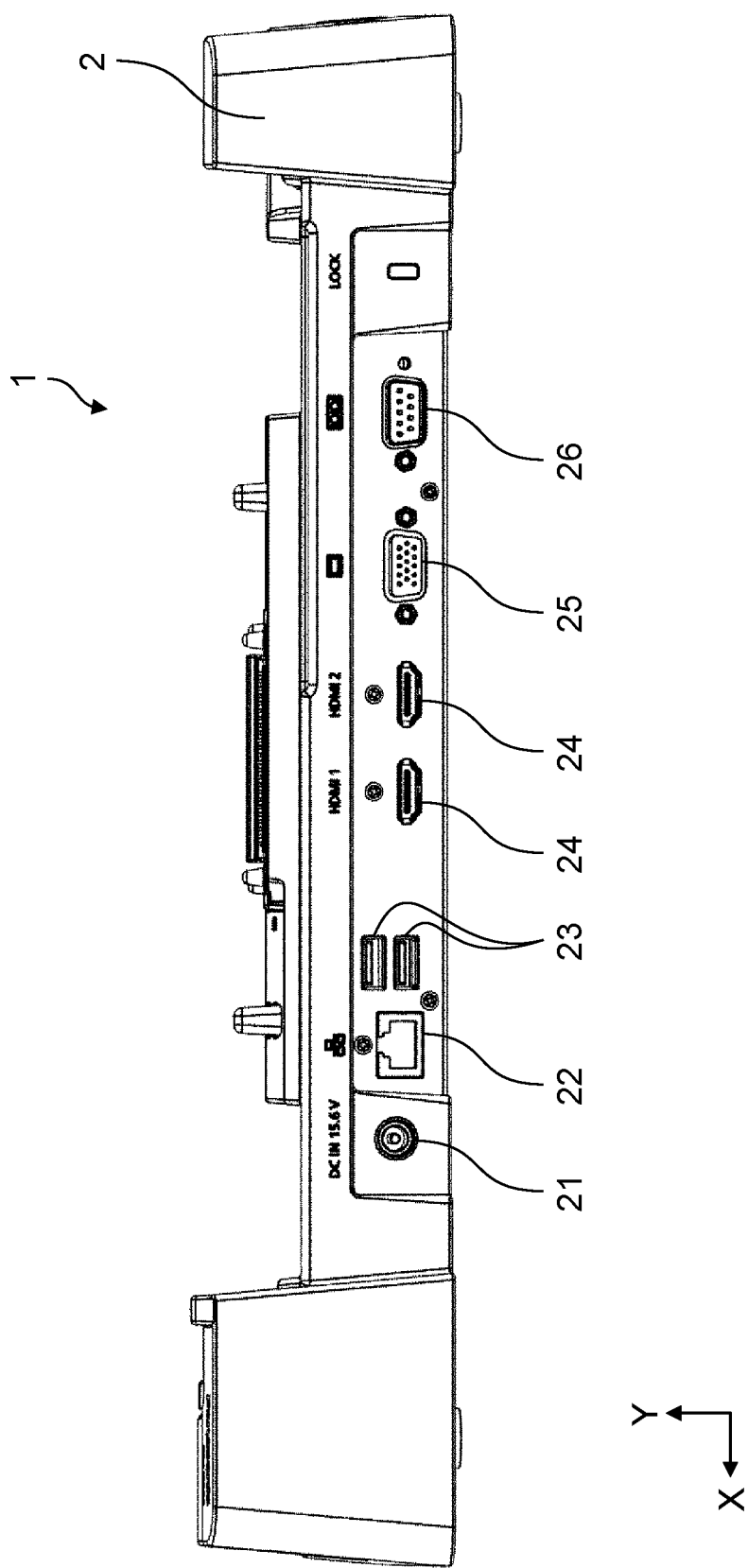
FIG. 5 is a diagram of the port replicator of FIG. 1 as viewed from behind.
Figure 6:
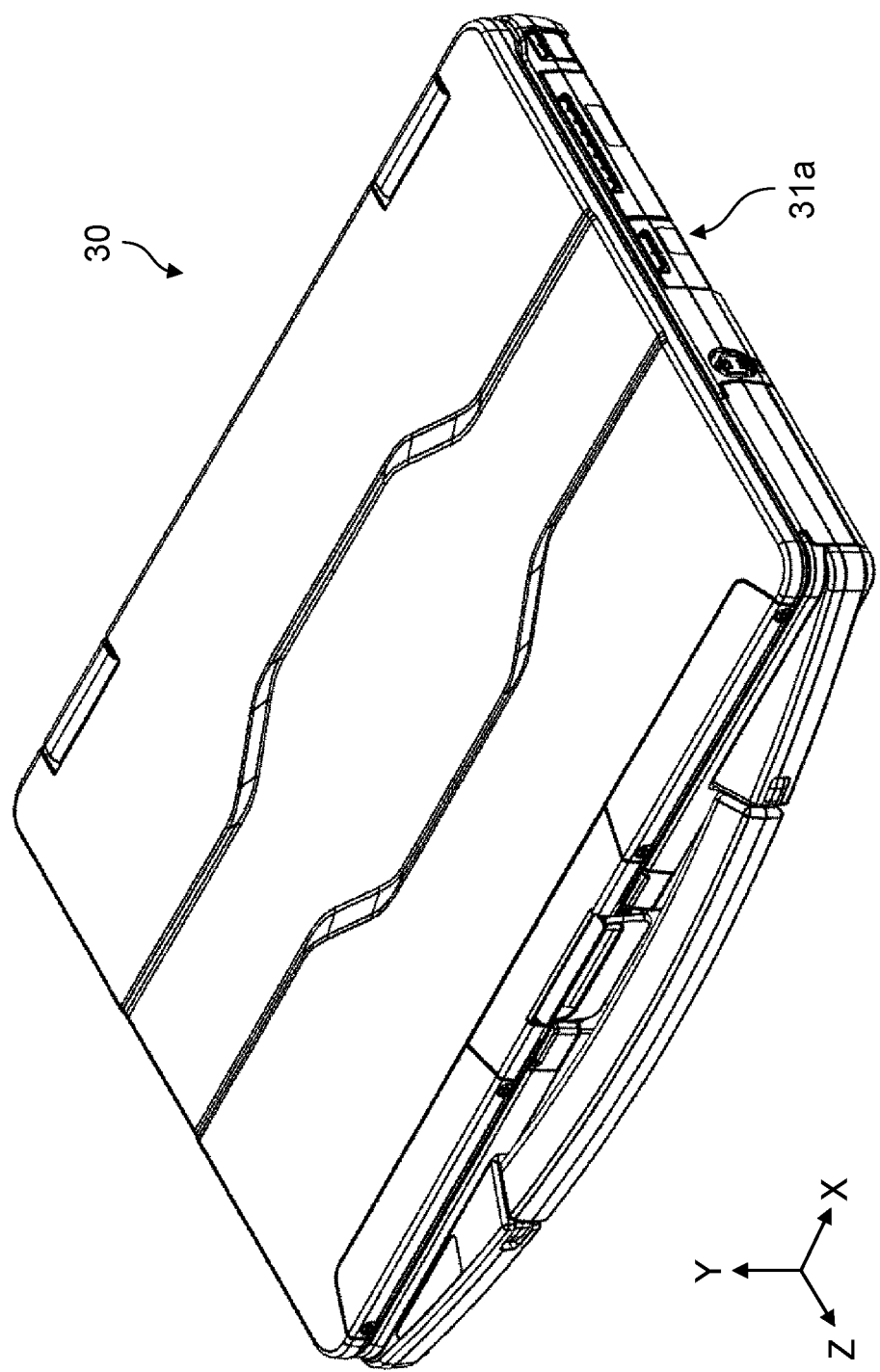
FIG. 6 is a diagram illustrating an example of a laptop PC that is to be connected to the port replicator of FIG. 1.
Figure 7:
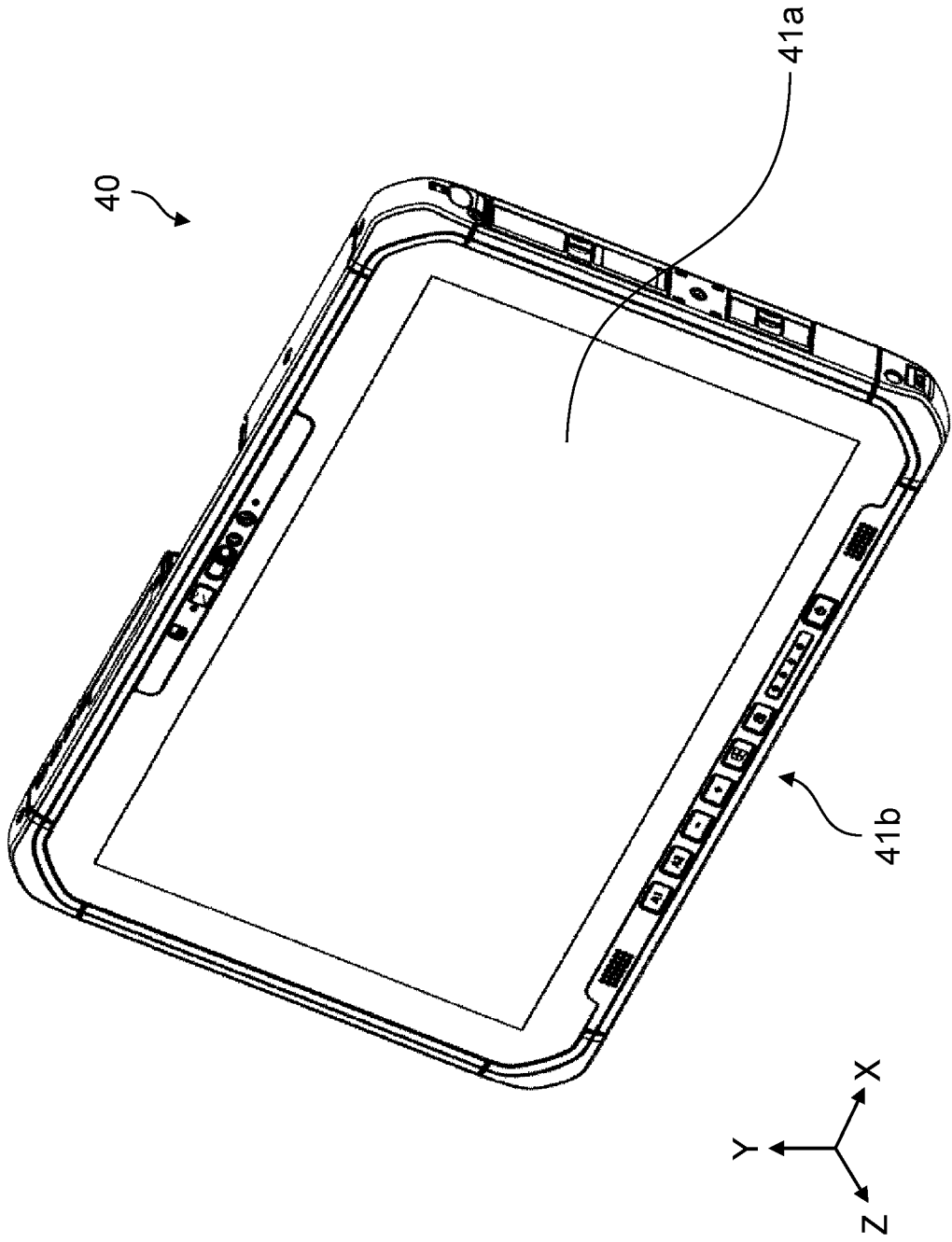
FIG. 7 is a diagram illustrating an example of a tablet PC that is to be connected to the port replicator of FIG. 1.
Figure 8:
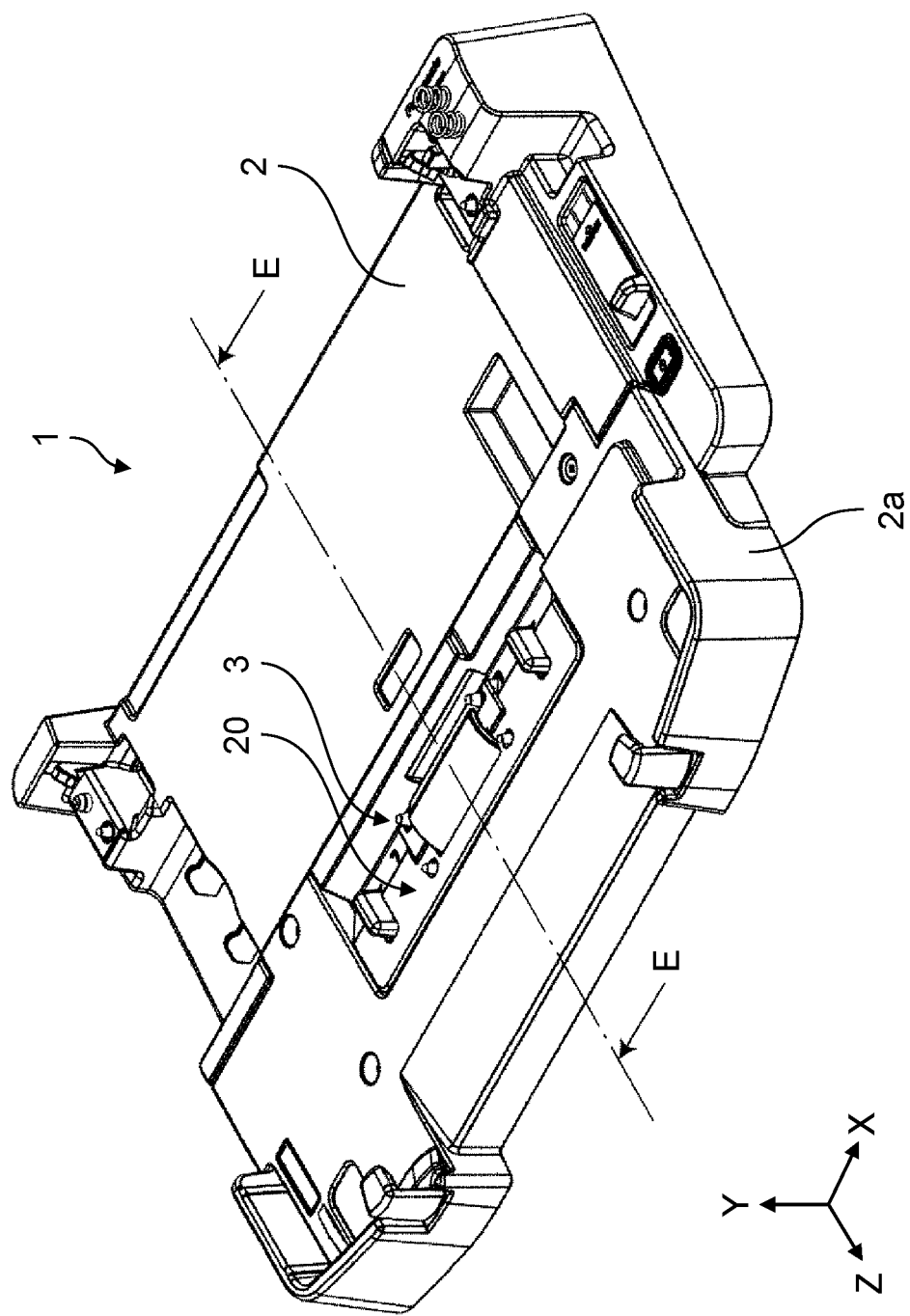
FIG. 8 is a perspective view of a laptop attachment attached to the port replicator of FIG. 1.
Figure 9:
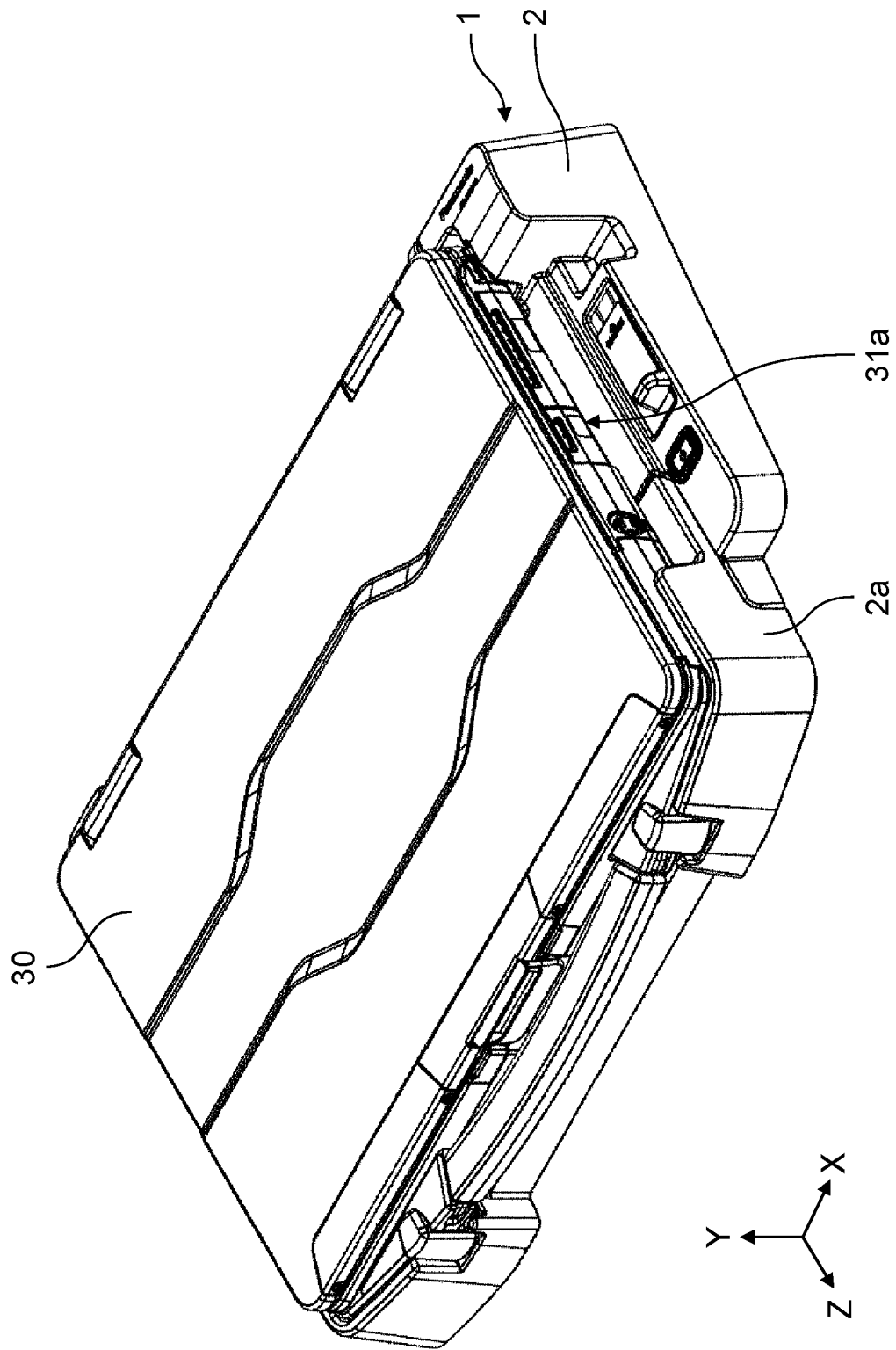
FIG. 9 is a perspective view of a laptop PC attached to the port replicator to which the laptop attachment of FIG. 6 is attached.
Figure 10:
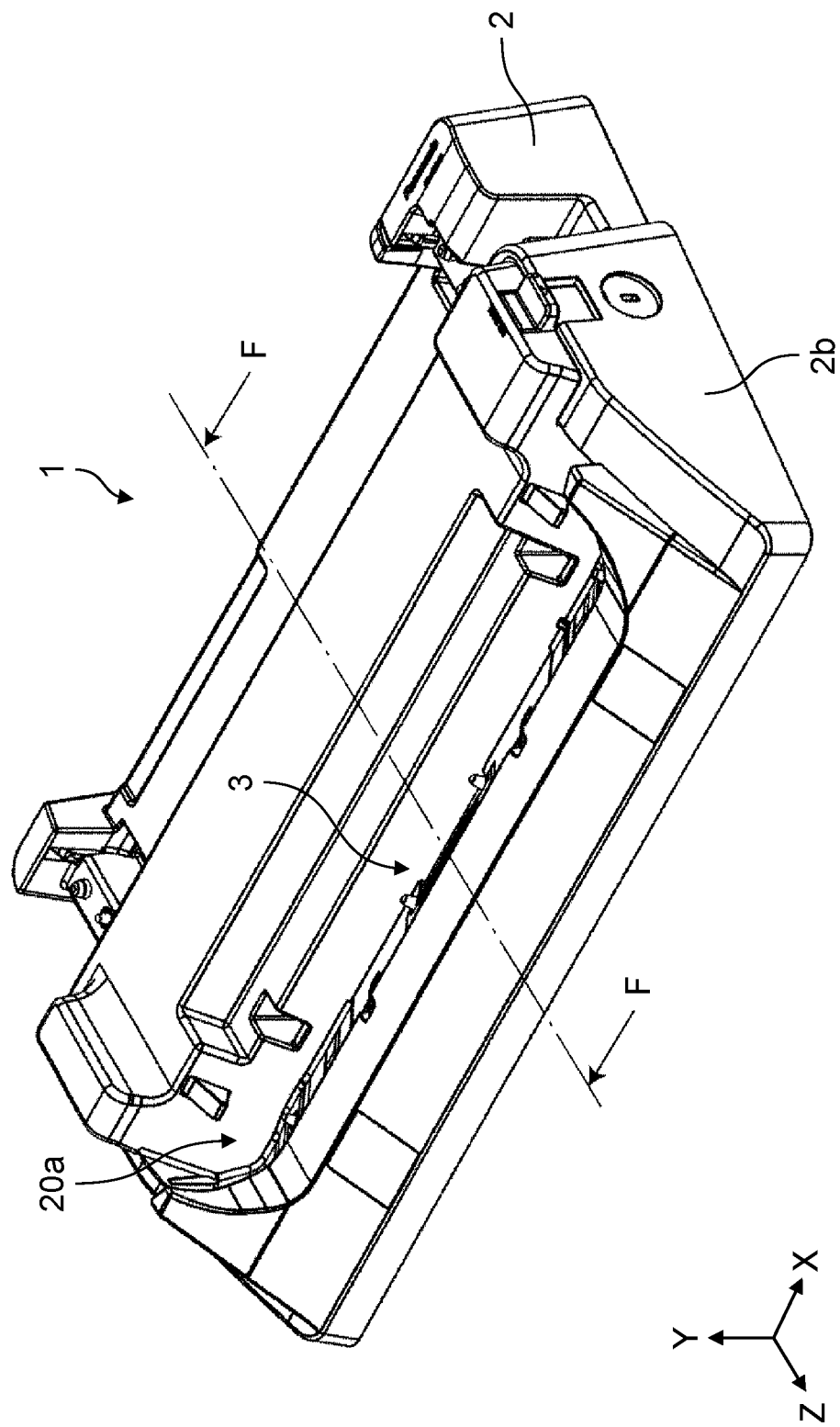
FIG. 10 is a perspective view of a tablet attachment attached to the port replicator of FIG. 1.
Figure 11:
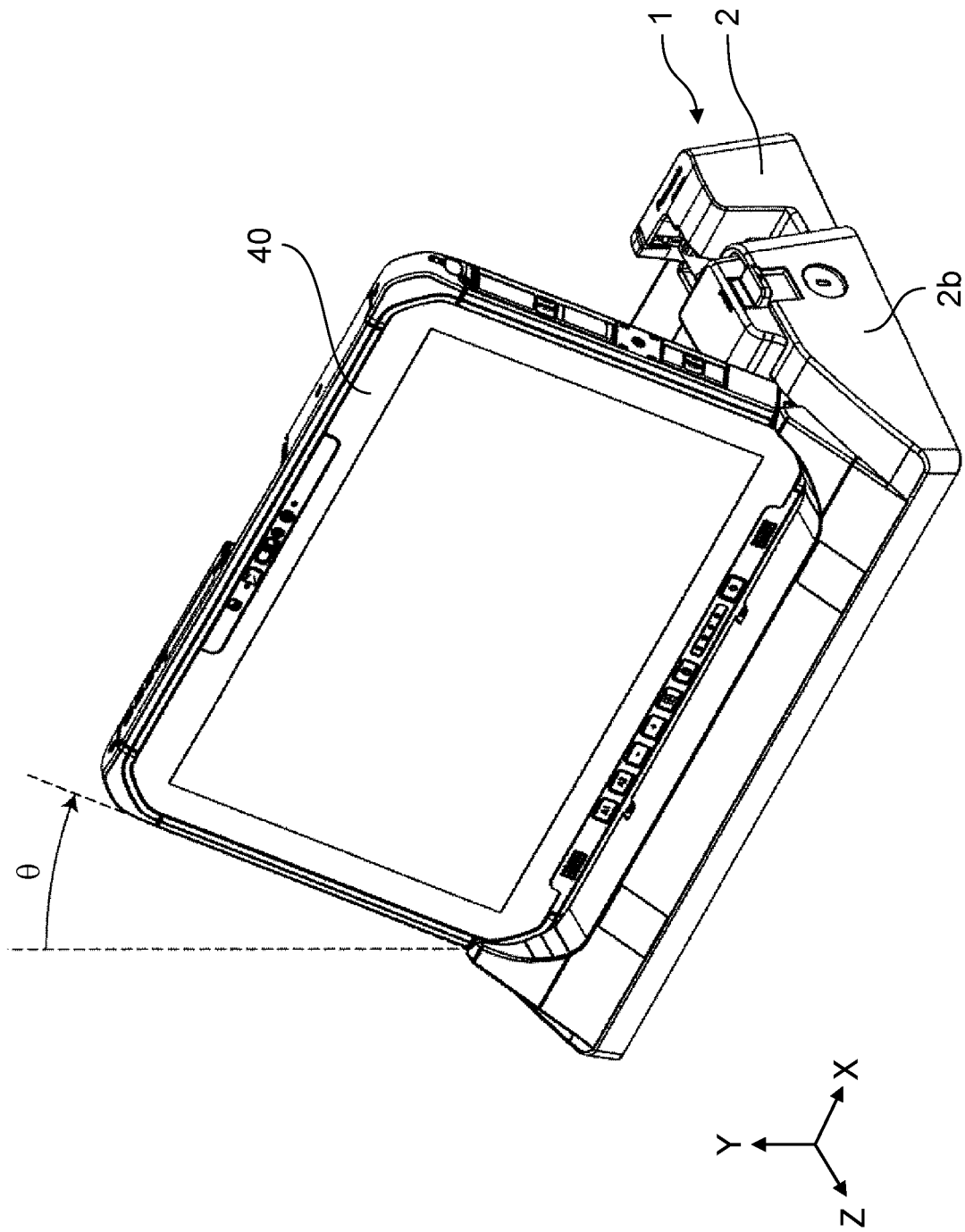
FIG. 11 is a perspective view of a tablet PC attached to the port replicator to which the tablet attachment of FIG. 10 is attached.

FIG. 1 is a perspective view of port replicator 1 according to a first exemplary embodiment of the present disclosure. FIG. 2 is an enlarged view of connector 3 extracted from port replicator 1 of FIG. 1. FIG. 3 is a diagram illustrating connector 3 of FIG. 2 with cover 9 opened. FIG. 4 is a diagram of connector 3 of FIG. 3 as viewed from another direction. FIG. 5 is a diagram of port replicator 1 of FIG. 1 as viewed from behind. FIG. 6 is a diagram illustrating an example of laptop PC 30 that is to be connected to port replicator 1 of FIG. 1. FIG. 7 is a diagram illustrating an example of tablet PC 40 that is to be connected to port replicator 1 of FIG. 1. FIG. 8 is a perspective view of laptop attachment 2a attached to port replicator 1 of FIG. 1. FIG. 9 is a perspective view of laptop PC 30 attached to port replicator 1 to which laptop attachment 2a of FIG. 6 is attached. FIG. 10 is a perspective view of tablet attachment 2b attached to port replicator 1 of FIG. 1. FIG. 11 is a perspective view of tablet PC 40 attached to port replicator 1 to which tablet attachment 2b of FIG. 10 is attached.

Each drawing in the following description indicates an X-direction that may be referred to as a width direction, a Y-direction that may be referred to as a thickness direction, and a Z-direction that may be referred to as a depth direction.

Port replicator 1 according to the first exemplary embodiment includes connector 3 that is accommodated in housing 2 as illustrated in FIG. 1. As illustrated in FIGS. 2 and 3, connector 3 includes terminal 4, body 5, shaft 6, retainers 7a, 7b (see FIGS. 15 and 16), and two elastic bodies 8. Housing 2 is not an essential component.

As illustrated in FIGS. 2 and 3, connector 3 includes cover 9 configured to cover terminal 4 and pusher 10 configured to rotatably support cover 9. Cover 9 is rotated when pusher 10 is pressed in a −Y-direction in FIGS. 2 and 3 to expose terminal 4. When pusher 10 is not pressed, cover 9 has a function of protecting terminal 4 by covering terminal 4. Cover 9 and pusher 10 are each not an essential component.

As illustrated in FIG. 4, connector 3 may include protruding member 11 disposed on body 5. Protruding member 11 may include multiple positioning pins 12.

As illustrated in FIG. 1, port replicator 1 may include earth pin 13 that is to be connected to the ground.

As illustrated in FIG. 5, port replicator 1 includes housing 2 provided with input-output terminals such as DC jack 21, LAN port 22, USB port 23, HDMI (registered trademark) port 24, VGA terminal 25, and serial port 26. For example, when an electronic device such as laptop PC 30 illustrated in FIG. 6 or tablet PC 40 illustrated in FIG. 7 is connected to port replicator 1, a battery of the electronic device can be charged, or the electronic device can be connected to an external device connected to the corresponding one of the input-output terminals.

For example, to connect laptop PC 30 to port replicator 1, laptop attachment 2a illustrated in FIG. 8 may be attached to port replicator 1. In this case, laptop PC 30 is attached to port replicator 1 as illustrated in FIG. 9.

For example, to connect tablet PC 40 to port replicator 1, tablet attachment 2b illustrated in FIG. 10 may be attached to port replicator 1. In this case, tablet PC 40 is attached to port replicator 1 as illustrated in FIG. 11.

<Connector>

Figure 12:
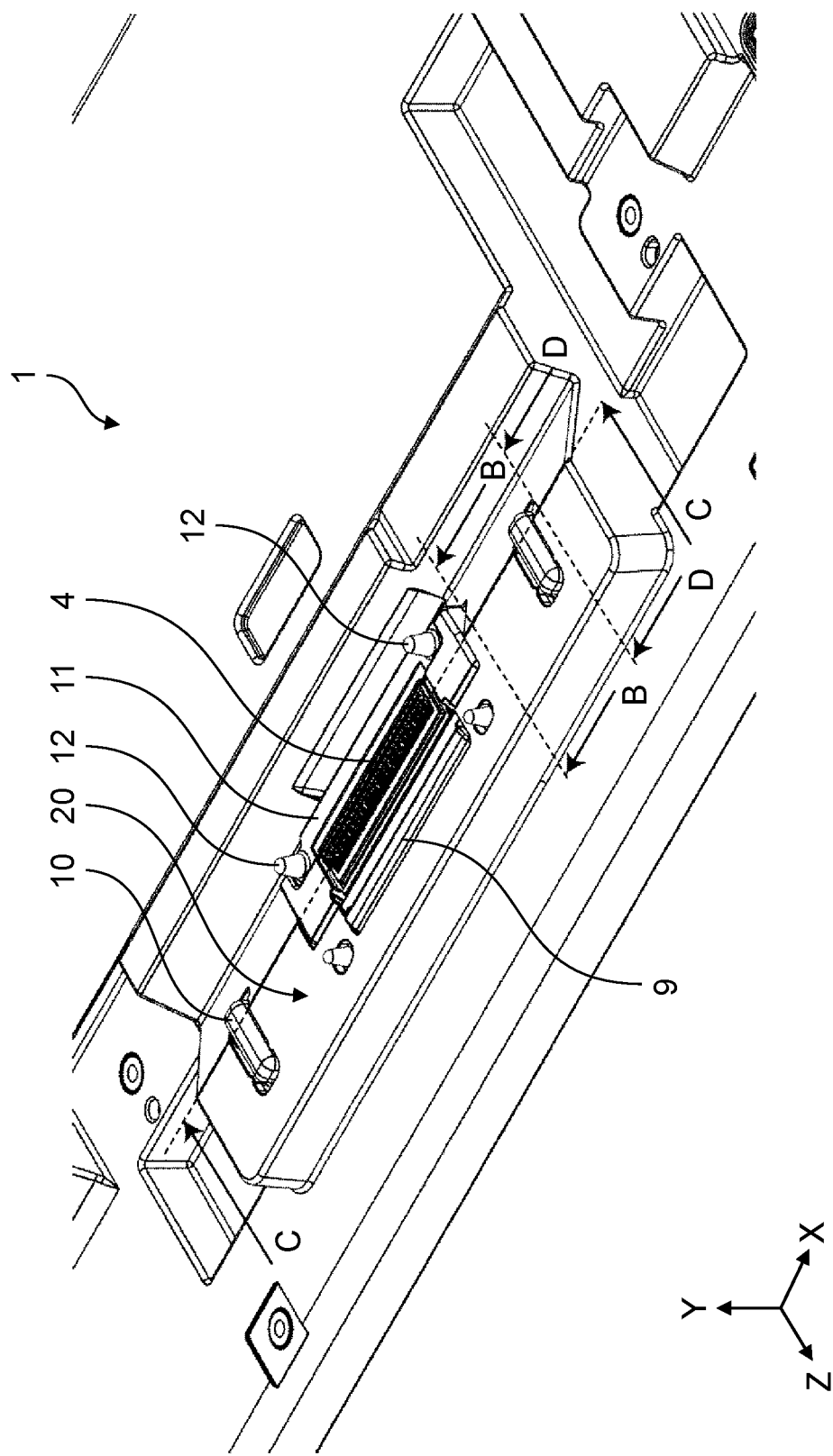
FIG. 12 is an enlarged view of region A surrounded by a broken line of the port replicator of FIG. 1.
Figure 13:
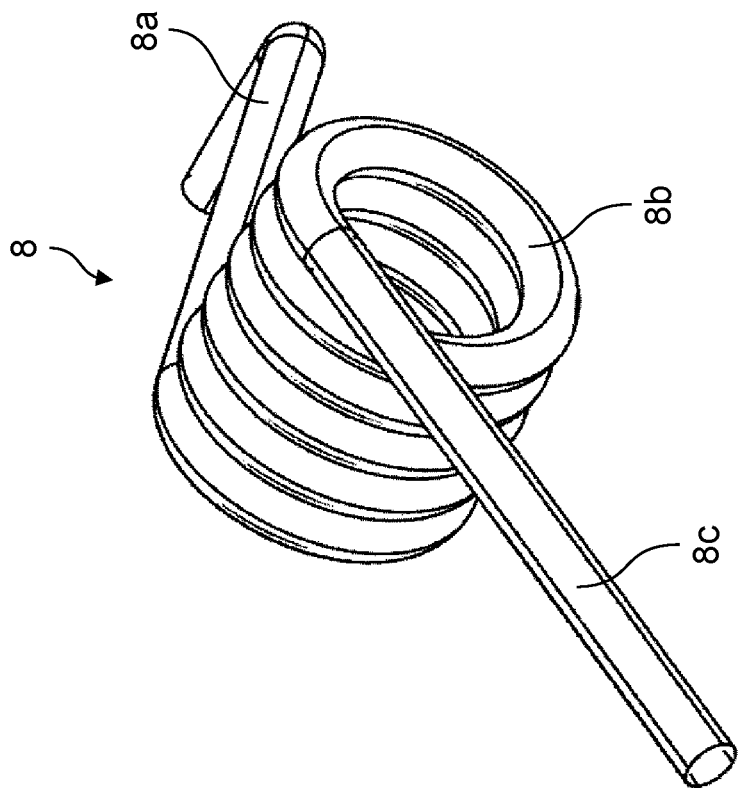
FIG. 13 is an enlarged view of an elastic body that is to be disposed in the connector of the port replicator.
Figure 14:
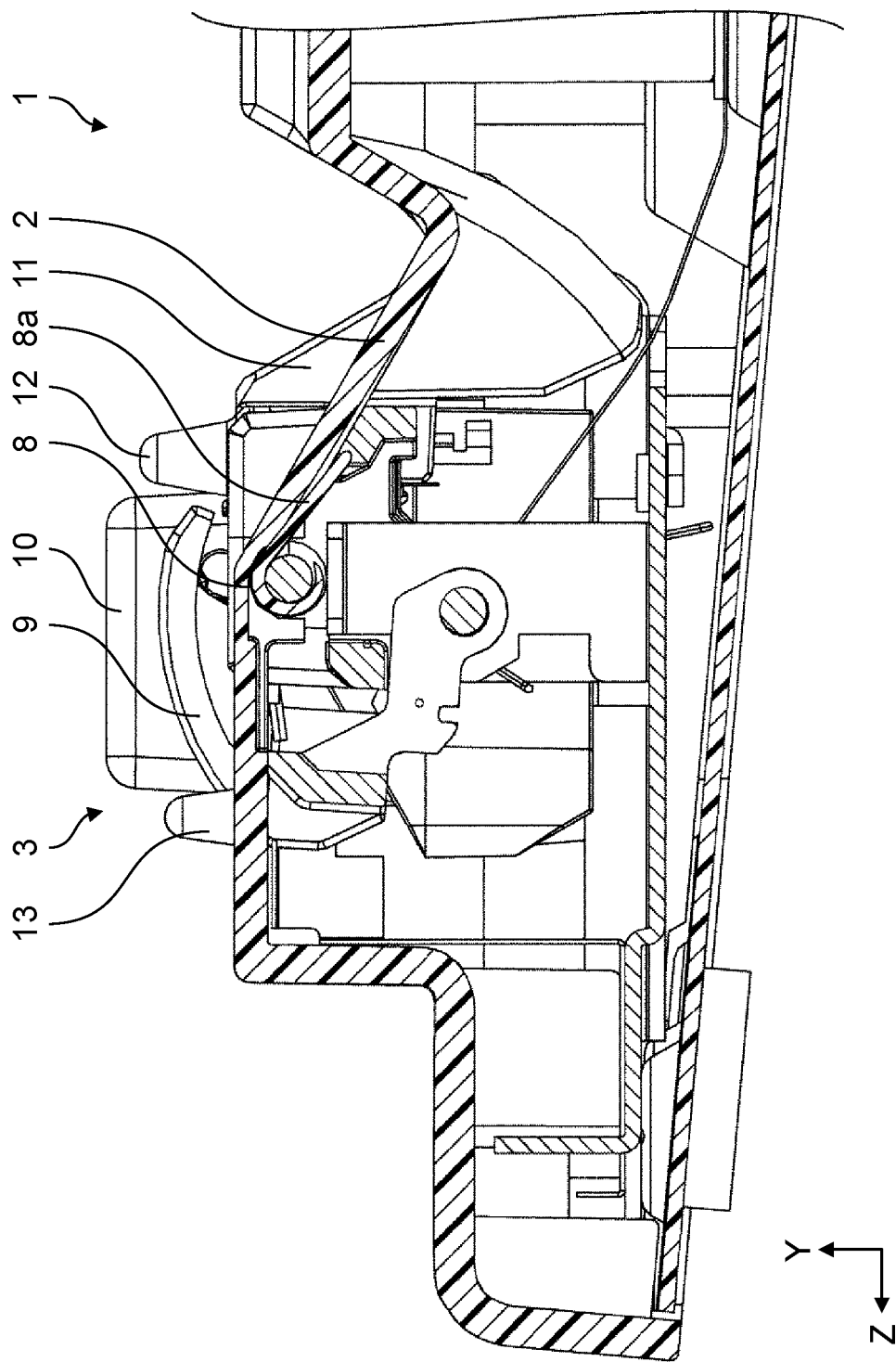
FIG. 14 is a sectional view of the port replicator of FIG. 12 taken along line B-B.
Figure 15:
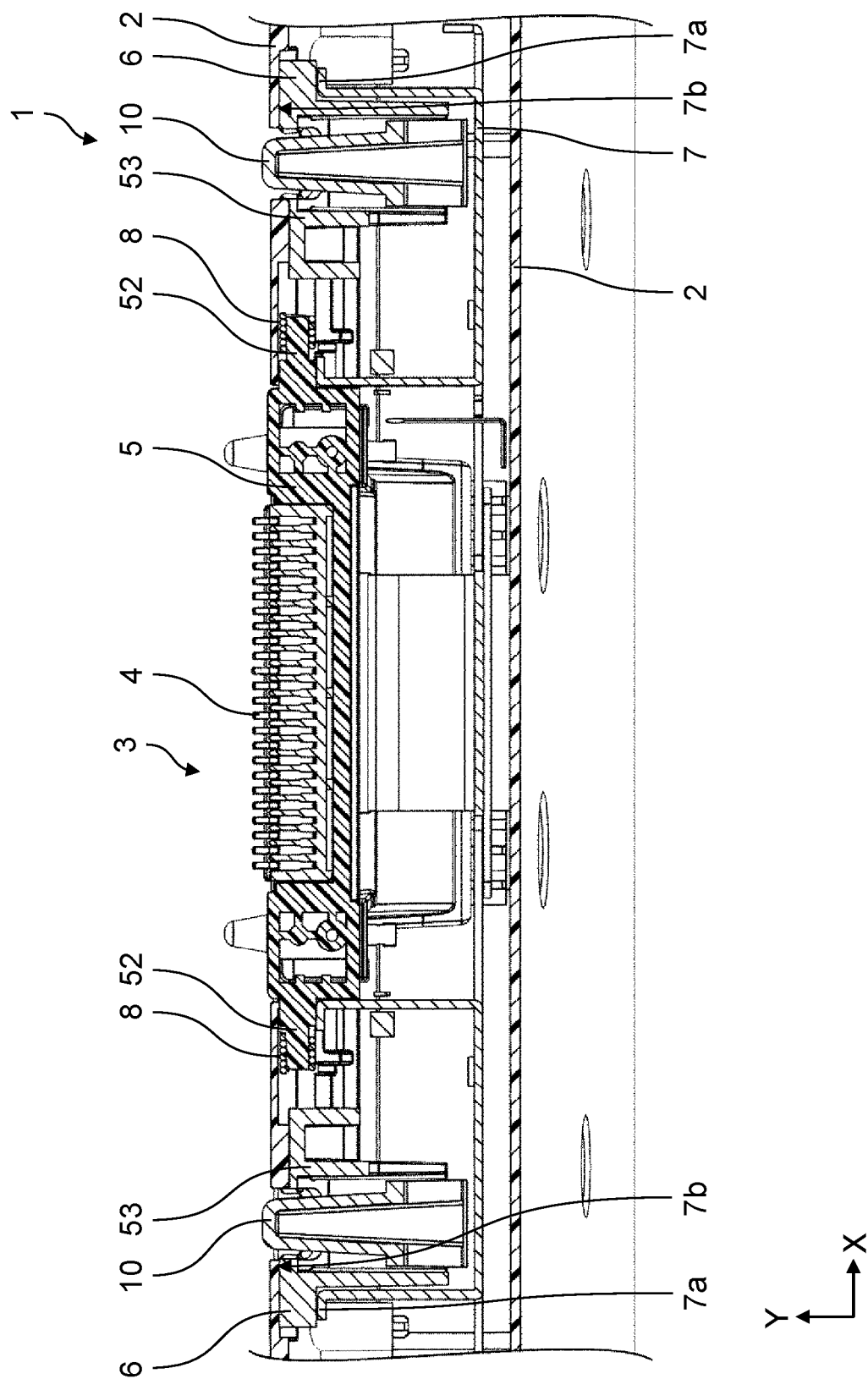
FIG. 15 is a sectional view of the port replicator of FIG. 12 taken along line C-C.
Figure 16:
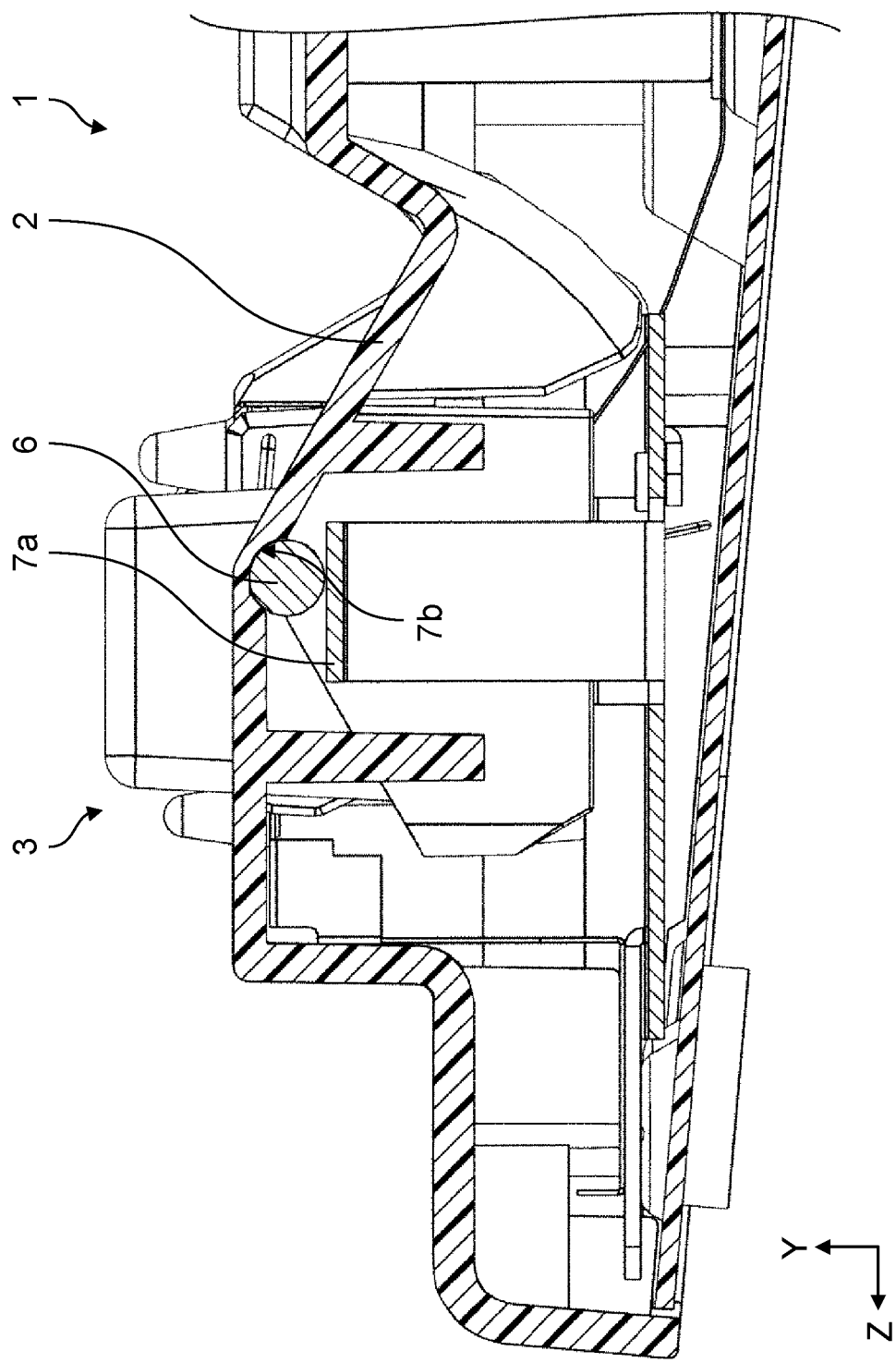
FIG. 16 is a sectional view of the port replicator of FIG. 12 taken along line D-D.

FIG. 12 is an enlarged view of region A surrounded by a broken line of port replicator 1 of FIG. 1. For purposes of illustration, FIG. 12 illustrates a state in which pusher 10 is pressed and cover 9 is opened. FIG. 13 is an enlarged view of elastic body 8 that is to be disposed in connector 3. FIG. 14 is a sectional view of port replicator 1 of FIG. 12 taken along line B-B. FIG. 15 is a sectional view of port replicator 1 of FIG. 12 taken along line C-C. FIG. 16 is a sectional view of port replicator 1 of FIG. 12 taken along line D-D.

As illustrated in FIG. 1, connector 3 is accommodated in housing 2. As described above, connector 3 includes terminal 4, body 5, shaft 6, retainers 7a, 7b, and two elastic bodies 8. Each component included in connector 3 will be described below.

<Terminal>

Terminal 4 is, for example, a terminal for connecting an electronic device such as laptop PC 30 or tablet PC 40 to port replicator 1. Terminal 4 is connected to an electronic device terminal (not illustrated) disposed in laptop PC 30 or tablet PC 40. As illustrated in FIG. 3, terminal 4 is accommodated in body 5 and exposed from opening 5a provided in body 5. Although terminal 4 has a rectangular shape in the present exemplary embodiment, it may have another shape such as a circular shape or a polygonal shape.

<Body>

Body 5 accommodates terminal 4. Alternatively, body 5 is provided with opening 5a through which terminal 4 is exposed. As illustrated in FIGS. 2 and 3, body 5 in the present exemplary embodiment includes first container 51, two attachment parts 52, two second containers 53, and two shafts 6, which are integrally formed. First container 51 accommodates terminal 4, and is provided with a hole for accommodating terminal 4. Terminal 4 in the present exemplary embodiment has a rectangular shape, so that first container 51 is in a shape having a longitudinal direction. Two attachment parts 52 are configured to attach two respective elastic bodies 8 described later. Two second containers 53 are each provided with a hole for housing corresponding one of two pushers 10 to be described later. Two shafts 6 are provided at respective opposite ends of body 5. Body 5 can be made of a synthetic resin or the like, for example.

Body 5 is rotated in a predetermined rotation direction with shafts 6 as rotation axis AX. Body 5 is pressed in a predetermined rotation direction by elastic bodies 8. Here, the predetermined rotation direction is counterclockwise when viewed from the width direction (+X-direction), and may be referred to below as a first rotation direction. Additionally, a direction opposite to the first rotation direction may be referred to as a second rotation direction.

Rotation of body 5 in the first rotation direction is restricted by bringing body 5 into contact with housing 2. When the attachment or the electronic device is not connected to port replicator 1, body 5 is disposed with a connection part of terminal 4, the connection part being to be connected to an electronic device terminal and facing a direction perpendicular to placement surface 20 (see FIG. 12) of housing 2. Body 5 can be rotated by angle θ in the second rotation direction from a state where the connection part of terminal 4 is directed in the direction perpendicular to placement surface 20 (see FIG. 18). Angle θ can be set to from 30 degrees to 60 degrees inclusive, for example.

<Elastic Body>

Rotation of body 5 in the first rotation direction is restricted by two elastic bodies 8. As illustrated in FIGS. 2 and 3, body 5 includes first container 51 that is provided at opposite ends in the longitudinal direction with two respective attachment parts 52. Attachment parts 52 in the present exemplary embodiment are each a columnar protrusion protruding from first container 51. Attachment parts 52 each may be changed in shape depending on a shape of elastic body 8 or the like. Attachment parts 52 are each located on rotation axis AX of shaft 6.

<Attachment Part>

Two attachment parts 52 are provided with respective elastic bodies 8 attached. As two elastic bodies 8, a torsion coil spring illustrated in FIG. 13 can be used, for example. Elastic body 8 includes coil part 8b of the torsion coil spring and is attached to attachment part 52 while coil part 8b is inserted into attachment part 52. The torsion coil spring includes one arm 8a supported by body 5, and another arm 8c fixed to housing 2. The other arm 8c fixed to housing 2 serves as a fulcrum, and elastic body 8 presses body 5 in the first rotation direction about the fulcrum. Elastic body 8 is not limited to a torsion coil spring, and may be a leaf spring, a compression coil spring, or the like, for example.

The present exemplary embodiment includes two elastic bodies 8 that are attached to two respective attachment parts 52, and terminal 4 that is disposed between two attachment parts 52. Alternatively, one or more elastic bodies 8, and one or more attachment parts 52, may be provided.

<Shaft>

Shaft 6 is provided in body 5. Specifically, shaft 6 is provided at each of opposite ends of body 5 in the longitudinal direction. Although the present exemplary embodiment includes two shafts 6 are provided at respective opposite ends of body 5 in the longitudinal direction, shaft 6 is not limited in placement position and number.

<Retainer>

Bracket 7 (see FIGS. 2 and 3) disposed on body 5 is partially bent to form two first retainers 7a that hold two respective shafts 6. As illustrated in FIGS. 15 and 16, a groove is formed in a part of an inner wall of housing 2 to form second retainer 7b. First retainer 7a and second retainer 7b hold shaft 6. That is, the "retainer" of the present disclosure is a combination of first retainer 7a and second retainer 7b. The shape of the retainer is not limited to this, and may be any shape as long as body 5 can be rotatably held about a rotation axis of shaft 6.

<Protruding Member>

Returning to FIG. 4, protruding member 11 may be disposed in body 5. Protruding member 11 is formed by bending a plate-like member in the second rotational direction, the plate-like member being disposed on body 5 substantially perpendicular to a direction in which the connection part of terminal 4 is directed (see FIG. 17). Protruding member 11 is disposed to protrude outward in the rotation direction of body 5. When protruding member 11 receives a force, body 5 can be rotated in a direction opposite to the predetermined rotation direction, or in the second rotation direction.

Figure 17:
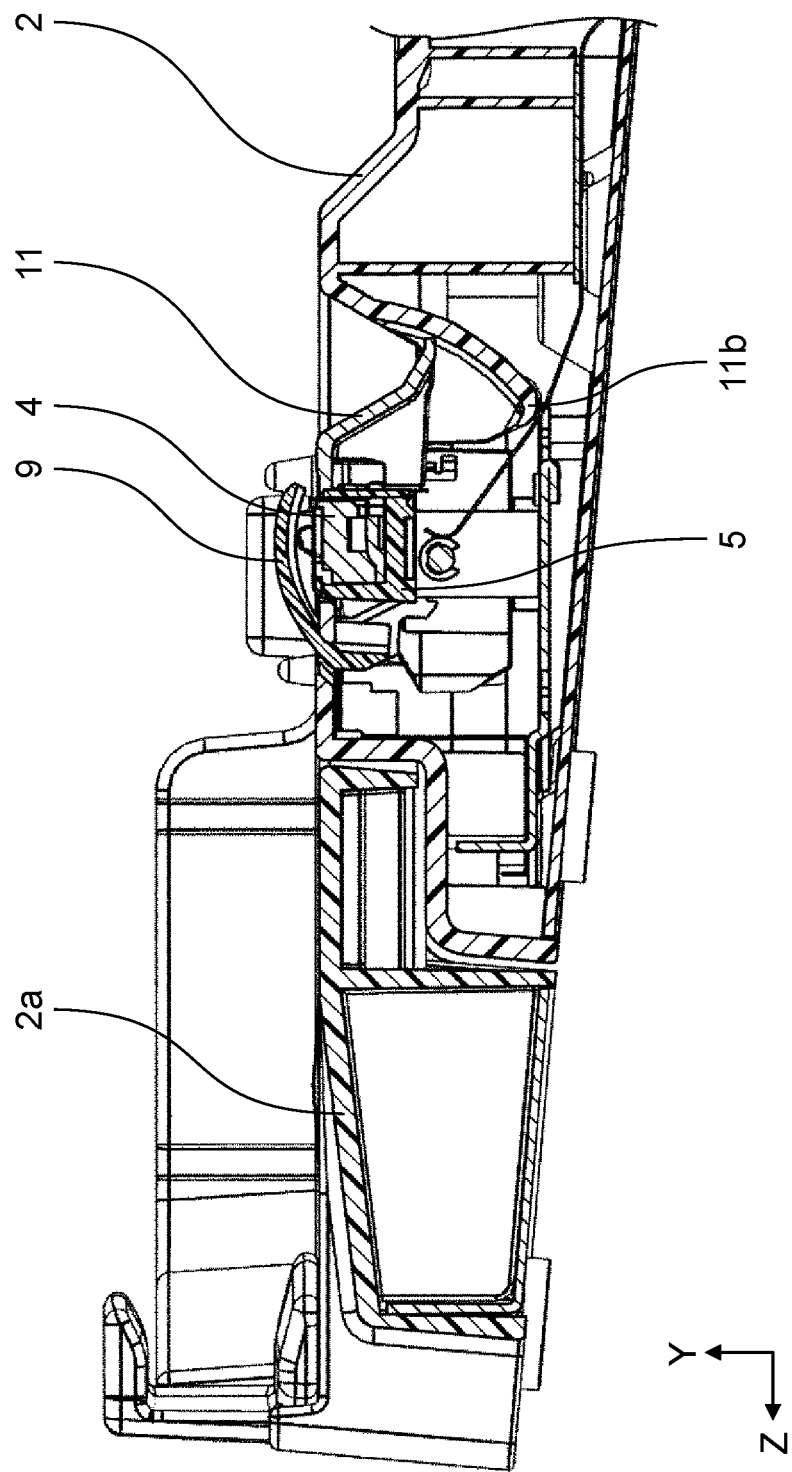
FIG. 17 is a sectional view of the port replicator to which the laptop attachment of FIG. 8 is attached, taken along line E-E.
Figure 18:
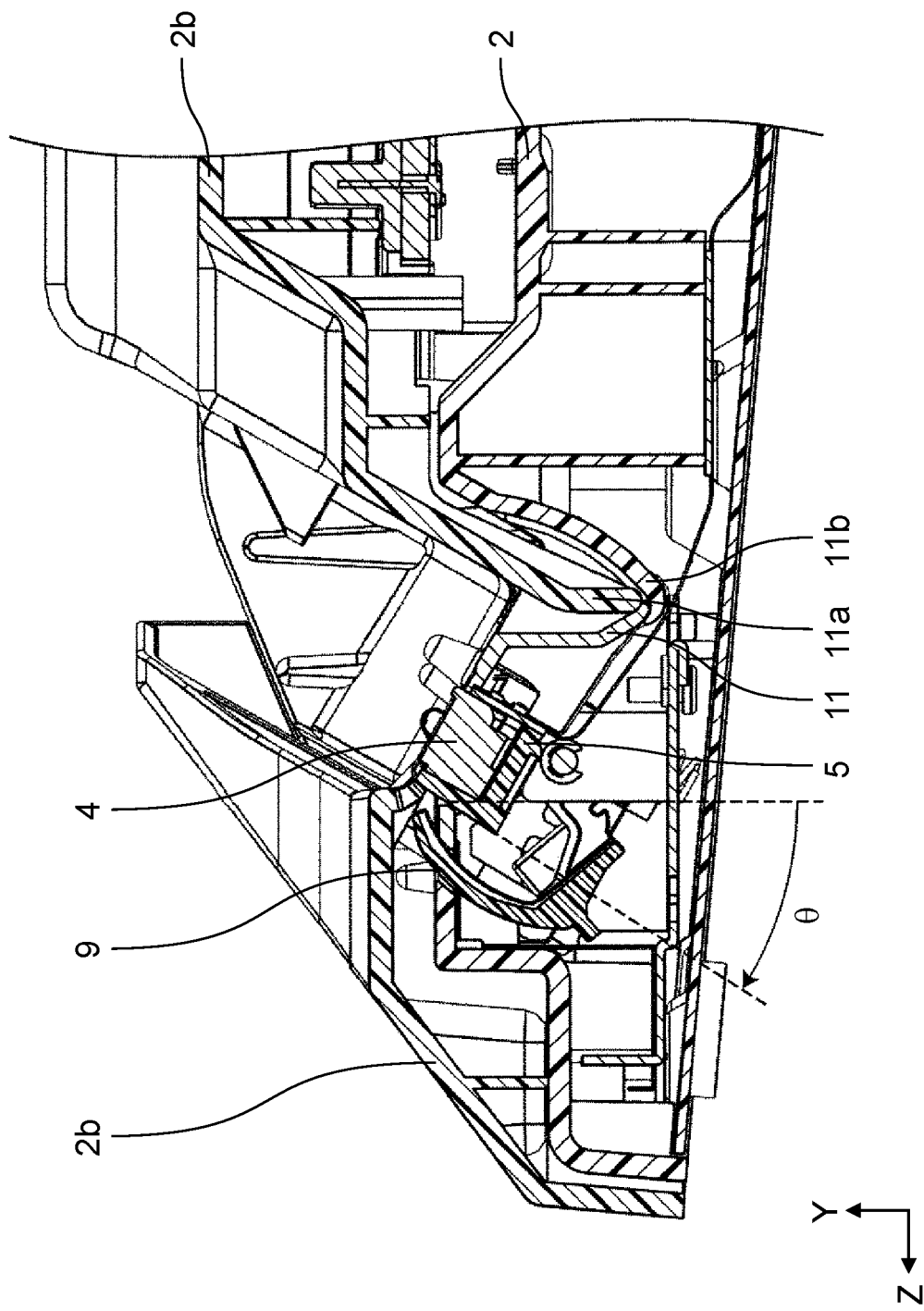
FIG. 18 is a sectional view of the port replicator to which the tablet attachment of FIG. 10 is attached, taken along line F-F.
Figure 19:
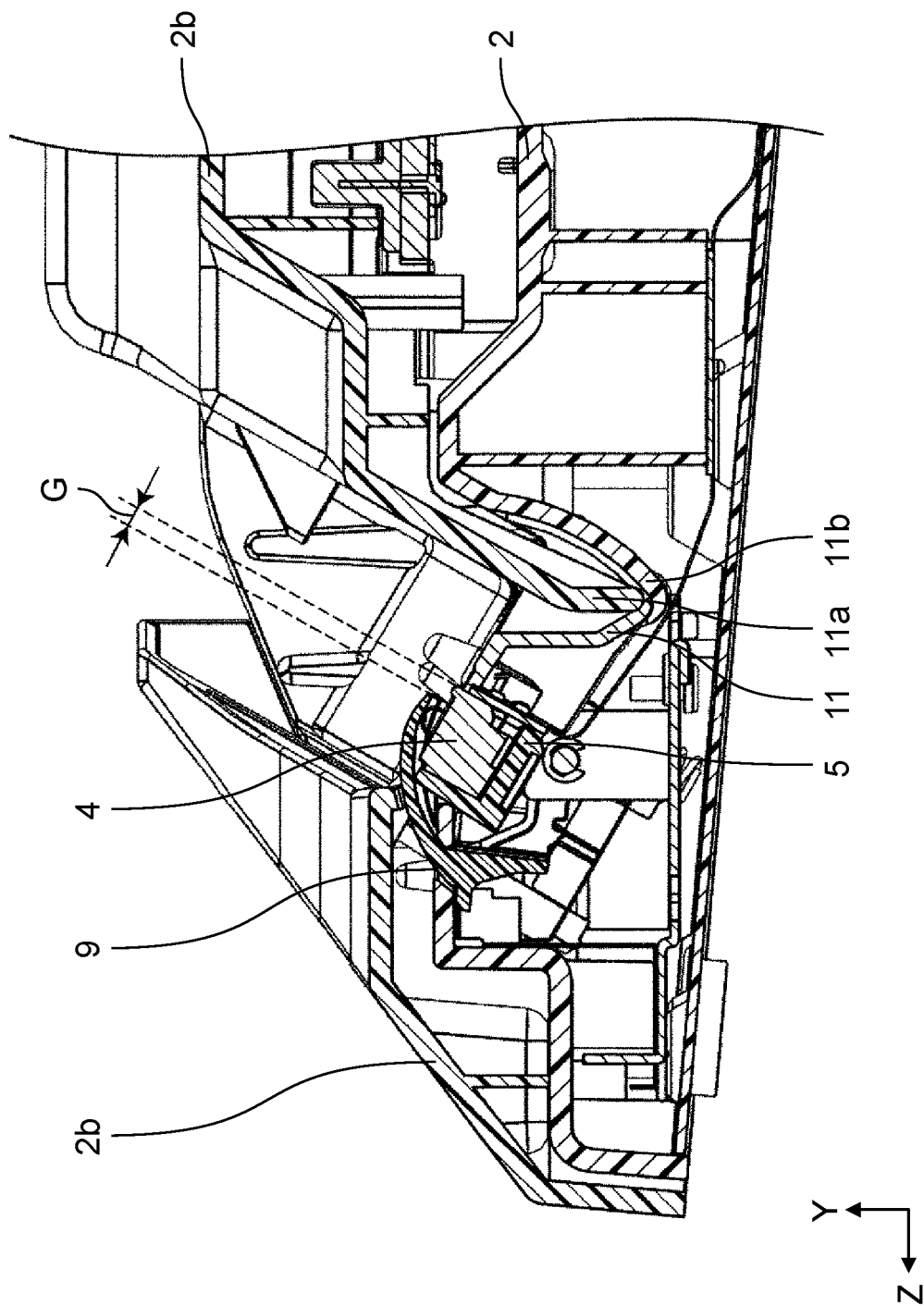
FIG. 19 illustrates a terminal covered with a cover in the sectional view of FIG. 18.

As illustrated in FIGS. 17 to 19 described later, when a part of attachment 2b comes into contact with protruding member 11 to apply a force to protruding member 11, body 5 rotates in the second rotation direction together with protruding member 11. Body 5 can be changed in rotation angle by adjusting rotation of protruding member 11.

Although protruding member 11 in the present exemplary embodiment is formed in a plate shape, the shape of protruding member 11 is not limited thereto.

<Positioning Pin>

Protruding member 11 includes two positioning pins 12 extending in a direction in which terminal 4 is exposed from opening 5a of body 5. In other words, protruding member 11 includes two positioning pins 12 extending in a direction in which the connection part of terminal 4 is directed, or in a direction perpendicular to placement surface 20, from opening 5a of body 5 (see FIGS. 2 to 4). Positioning pin 12 is to be inserted into an insertion hole (not illustrated) that is formed near an electronic device terminal disposed in an electronic device such as laptop PC 30 or tablet PC 40. Inserting positioning pin 12 into the insertion hole of the electronic device facilitates positioning when the electronic device is connected to port replicator 1. Positioning pin 12 is not an essential component.

Positioning pin 12 is preferably made of metal such as a magnesium alloy, for example. Protruding member 11 and positioning pin 12 in the present exemplary embodiment are integrally made of a magnesium alloy. Alternatively, positioning pin 12 made of metal may be disposed on protruding member 11 made of a synthetic resin or the like. The metal constituting positioning pin 12 is not limited to the magnesium alloy.

<Cover>

As illustrated in FIGS. 2 and 3, cover 9 configured to cover terminal 4 is disposed. Cover 9 is rotatably supported by two pushers 10 that are each inserted into a hole of corresponding one of two second containers 53 of body 5. Two pushers 10 each include a recess (not illustrated) that supports corresponding one of opposite ends of cover 9. When an end of cover 9 comes into contact with a concave surface of pusher 10, cover 9 is supported by pusher 10. As illustrated in FIG. 2, when pusher 10 is not pressed, terminal 4 is covered with cover 9. As illustrated in FIG. 3, when pusher 10 is pressed, cover 9 is rotated in the direction opposite to the first rotation direction to expose terminal 4. Cover 9 is not in conjunction with rotation of body 5.

<Pusher>

Pusher 10 is pressed by an electronic device coming into contact with pusher 10 when the electronic device is connected to port replicator 1. Thus, when the electronic device is connected to port replicator 1, cover 9 is opened, and then terminal 4 can be connected to an electronic device terminal.

When an electronic device is not connected to port replicator 1, pusher 10 is not pressed and terminal 4 is covered with cover 9. Thus, when terminal 4 is not used, terminal 4 can be protected by cover 9.

<Housing>

Housing 2 accommodates connector 3, and allows an electronic device to be placed thereon. As described above, two elastic bodies 8 are pressed against housing 2 to press body 5 in the first rotation direction. At this time, rotation of body 5 in the first rotation direction is restricted by bringing body 5 into contact with housing 2. When protruding member 11 receives no force, the connection part of terminal 4 is disposed facing the direction perpendicular to placement surface 20 of housing 2.

Housing 2 in the present exemplary embodiment includes placement surface 20 for an electronic device. When protruding member 11 receives no force, housing 2 is disposed to cause the connection part of terminal 4 to be directed in the direction perpendicular to placement surface 20 (see FIG. 12).

<Attachment>

Attachments 2a, 2b each can be detachably attached to housing 2.

Laptop attachment 2a is an attachment for laptop PC 30, and can expand placement surface 20 of housing 2 to improve stability of connection between laptop PC 30 and port replicator 1. When laptop PC 30 is connected to port replicator 1 to which laptop attachment 2a is attached, laptop PC 30 is placed on port replicator 1 while having bottom surface 31a in contact with placement surface 20, as illustrated in FIG. 9. This allows a user to operate laptop PC 30 by opening laptop PC 30 and tilting its display (not illustrated) to a desired angle.

Laptop PC 30 can be connected to port replicator 1 even when laptop attachment 2a is not attached.

Tablet attachment 2b is an attachment for tablet PC 40. Unlike laptop PC 30, tablet PC 40 is a plate-shaped electronic device. Thus, when tablet PC 40 is connected to port replicator 1 while maintaining display 41a at a desired angle, a user can easily use tablet PC 40.

As illustrated in FIG. 10, tablet attachment 2b is provided with guide part 20a into which tablet PC 40 is to be inserted. When tablet PC 40 is inserted into guide part 20a, tablet PC 40 is connected to port replicator 1 while display 41a (see FIG. 7) is maintained a desired angle as illustrated in FIG. 11. The desired angle is, for example, angle θ of a surface on which display 41a is disposed with respect to an XY plane as illustrated in FIG. 11. Angle θ can be set to any value depending on a type or shape of an electronic device.

Tablet attachment 2b is provided with pressing part 11a (see FIGS. 18 and 19). Pressing part 11a is a plate-shaped member extending from attachment 2b. When pressing part 11a comes into contact with protruding member 11, body 5 can be rotated in the second rotation direction.

When tablet attachment 2b is attached to housing 2 of port replicator 1, pressing part 11a comes into contact with protruding member 11 of connector 3. Then, pressing part 11a applies a force to protruding member 11 in the second rotation direction, and as a result, body 5 is rotated in the second rotation direction. Thus, when tablet attachment 2b is attached to port replicator 1, the connection part of terminal 4 is inclined with respect to placement surface 20 of housing 2. Attaching tablet attachment 2b enables body 5 to be rotated to connect tablet PC 40 to port replicator 1.

<Stopper>

Housing 2 of port replicator 1 is provided with stopper 11b is provided in the (see FIGS. 17 to 19). Stopper 11b comes into contact with protruding member 11 to restrict rotation of body 5 in the second rotation direction when protruding member 11 is rotated in the second rotation direction.

[Operation]

Operation of port replicator 1 will be described.

FIG. 17 is a sectional view of port replicator 1 to which laptop attachment 2a of FIG. 8 is attached, taken along line E-E. FIG. 18 is a sectional view of port replicator 1 to which tablet attachment 2b of FIG. 10 is attached, taken along line F-F. FIG. 19 illustrates terminal 4 covered with cover 9 in the sectional view of FIG. 18.

As illustrated in FIG. 17, when laptop attachment 2a is attached to port replicator 1, protruding member 11 of connector 3 receives no force, and thus body 5 is rotated in the first rotation direction. At this time, body 5 comes into contact with housing 2 to restrict rotation of body 5. Thus, the connection part of terminal 4 in connector 3 is exposed in the direction perpendicular to placement surface 20.

As illustrated in FIG. 18, when tablet attachment 2b is attached instead of laptop attachment 2a, body 5 is rotated by angle θ in the second rotation direction. Tablet attachment 2b is provided with pressing part 11a. When tablet attachment 2b is attached to port replicator 1, protruding member 11 of connector 3 receives a force in the second rotation direction. Thus, connector 3 is rotated by angle θ in the second rotation direction.

Stopper 11b comes into contact with protruding member 11 to restrict the rotation of body 5 in the second rotation direction when protruding member 11 is rotated in the second rotation direction.

When protruding member 11 receives a force in the second rotation direction, protruding member 11 is pressed against stopper 11b. When protruding member 11 is pressed against stopper 11b, body 5 is supported while being rotated by angle θ from a Y-axis direction to the second rotation direction. In this manner, the rotation of body 5 is restricted. Angle θ is preferably from 30 degrees to 60 degrees inclusive, for example.

For example, angle θ of the rotation of body 5 can be changed by changing shape or the like of pressing part 11a. Thus, a direction in which the connection part of terminal 4 is directed can be changed by preparing multiple attachments suitable for desired angle θ of rotation, for example.

When protruding member 11 receives a force, terminal 4 and two pushers 10 accommodated in body 5 are rotated together with body 5. Then, cover 9 is not in conjunction with the rotation of body 5. Thus, gap G is formed between the tip of cover 9 and an end of terminal 4 with cover 9 closed as illustrated in FIG. 19. That is, when body 5 and pushers 10 are rotated in the second rotation direction, gap G is formed between cover 9 and body 5.

Effects

The exemplary embodiment described above enables both laptop PC 30 and tablet PC 40 to be connected to port replicator 1 including terminal 4. That is, port replicator 1 of the present disclosure can be connected to multiple electronic devices different in type. In general, terminal 4 used in port replicator 1 is often expensive. Thus, when one port replicator 1 can be connected to multiple types of electronic device, cost can be reduced.

Then, body 5 can be rotated by applying a force to protruding member 11, so that terminal 4 can be directed in an appropriate direction. When terminal 4 can be directed in an appropriate direction, an angle of inclination of display 41a of tablet PC 40 can be adjusted, for example, and thus improving usability for a user.

Stopper 11b with which protruding member 11 is in contact restricts the rotation of body 5 in the second rotation direction, so that stability of connection can be improved.

Multiple positioning pins facilitate connection of an electronic device to port replicator 1, so that stability of the connection can be improved. The positioning pins can be improved in strength when made of metal.

Cover 9 provided to cover terminal 4 enables terminal 4 to be protected when not in use. Cover 9 can be opened by being rotated in conjunction with pusher 10 when an electronic device is connected to port replicator 1.

Cover 9 forms gap G between cover 9 and body 5 when body 5 is rotated in the second rotation direction. Forming gap G allows cover 9 to be smoothly opened and closed.

Attachments 2a, 2b detachably attached to housing 2 enable improvement in stability of connection. Body 5 can be rotated by attaching tablet attachment 2b. Thus, port replicator 1 can be used for various types of electronic device.

Although the present disclosure has been described above by taking the above exemplary embodiment as an example, the present disclosure is not limited to the above exemplary embodiment.

Although port replicator 1 in the exemplary embodiment described above includes two elastic bodies 8, for example, the number of elastic bodies is not limited thereto, and may be one, or three or more.

Although port replicator 1 in the exemplary embodiment described above can be connected to laptop PC 30 or tablet PC 40, a connectable electronic device is not limited thereto.

Although the configuration in which protruding member 11 includes two positioning pins 12 has been described in the exemplary embodiment described above, the number of positioning pins may be three or more.

Although the configuration including two pushers 10 in conjunction with cover 9 has been described in the exemplary embodiment described above, the number of pushers is not limited to two.

Although attachment 2a or attachment 2b is attached to port replicator 1 to connect an electronic device in the exemplary embodiment described above, the attachment is not an essential component. For example, housing 2 may have functions of attachments 2a, 2b.

Although the configuration in which elastic body 8 is a torsion coil spring has been described in the exemplary embodiment described above, elastic body 8 is not limited to a torsion coil spring. For example, elastic body 8 may be a leaf spring or an elastic body such as rubber.

INDUSTRIAL APPLICABILITY

The present disclosure can be widely applied to a port replicator including a terminal and connectable to an electronic device.

REFERENCE MARKS IN THE DRAWINGS 1 port replicator
2 housing
2a, 2b attachment
4 terminal
5 body
5a opening
6 shaft
7a, 7b retainer
8 elastic body
9 cover
10 pusher
11 protruding member
11a pressing part
11b stopper
12 positioning pin
51 first container (container)
52 attachment part

The invention claimed is:

1. A port replicator comprising:
a body including an opening;
a terminal accommodated in the body and exposed from the opening;
a shaft provided in the body;
a retainer that rotatably holds the body about a rotation axis of the shaft such that the body and the terminal are rotatable together about the rotation axis;

one or more elastic bodies attached to the body and pressing the body in a predetermined rotation direction;

a cover configured to cover the terminal; and a pusher configured to rotatably support the cover, wherein the pusher is attached to the body, and the cover is configured to cover the terminal when the pusher is not pressed, and is configured to be rotated to expose the terminal when the pusher is pressed.

2. The port replicator according to claim 1, further comprising a protruding member disposed on the body and protruding outward in the predetermined rotation direction from the body, wherein when the protruding member receives a force, the body is rotated in a direction opposite to the predetermined rotation direction.

3. The port replicator according to claim 2, further comprising a stopper that comes into contact with the protruding member when the protruding member is rotated in the direction opposite to the predetermined rotation direction, wherein the protruding member comes into contact with the stopper to restrict rotation of the body in the direction opposite to the predetermined rotation direction.

4. The port replicator according to claim 2, wherein the protruding member includes multiple positioning pins extending in an exposure direction of the terminal from the opening of the body.

5. The port replicator according to claim 4, wherein the multiple positioning pins are made of metal.

6. The port replicator according to claim 2, further comprising:

a housing that accommodates the terminal, the body, the shaft, the retainer, and the one or more elastic bodies; and an attachment detachably attached to the housing and having a pressing part, wherein the one or more elastic bodies are pressed against the housing to press the body in the predetermined rotation direction, and the pressing part presses the protruding member to rotate the body in the direction opposite to the predetermined rotation direction when the attachment is attached to the housing.

7. The port replicator according to claim 1, wherein the body includes two attachment parts located on the rotation axis, the terminal is disposed between the two attachment parts, the one or more elastic bodies include two elastic bodies, and the two elastic bodies are attached to the two attachment parts, respectively.

8. The port replicator according to claim 1, wherein when the body and the pusher rotate in a direction opposite to the predetermined rotation direction, a gap is formed between the cover and the body.

9. The port replicator according to claim 1, further comprising a housing that accommodates the terminal, the body, the shaft, the retainer, and the one or more elastic bodies, wherein the one or more elastic bodies are pressed against the housing to press the body in the predetermined rotation direction.

10. The port replicator according to claim 9, further comprising an attachment that is detachably attached to the housing.

11. The port replicator according to claim 10, wherein the attachment includes a pressing part that rotates the body in a direction opposite to the predetermined rotation direction.

* * * * *